2,745,071

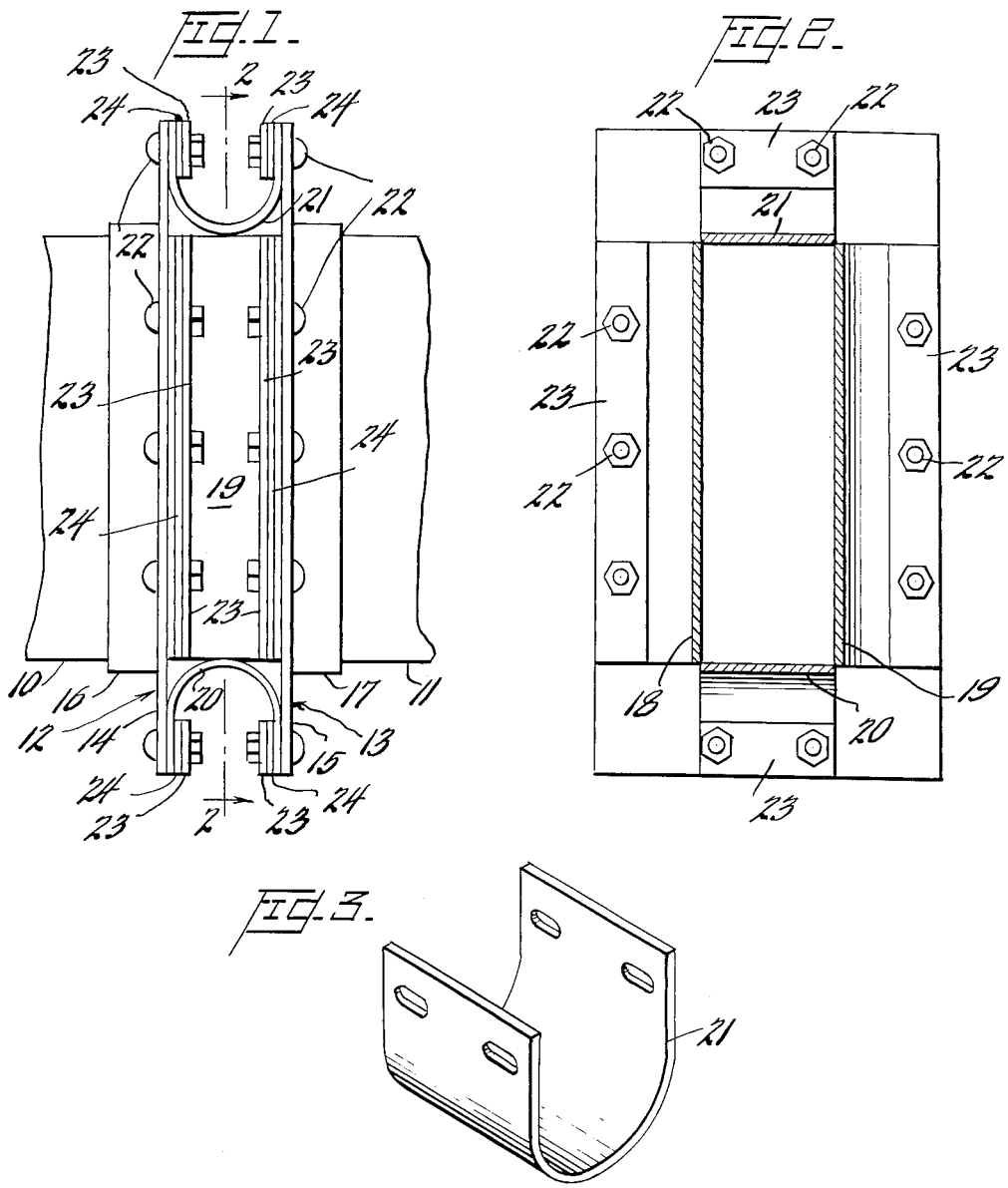
INVENTORS
Coleman J. Miller
Frank M. Krantz,
BY
B. L. Zanguril
ATTORNEY

United States Patent Office 2,745,071
Patented May 8, 1956

FLEXIBLE WAVE GUIDE COUPLING

Coleman J. Miller, Catonsville, and Frank M. Krantz, Baltimore, Md., assignors, by mesne assignments, to the United States of America as represented by the Secretary of the Navy Application May 14, 1952, Serial No. 287,664

2 Claims. (Cl. 333—98)

This invention relates in general to flexible coupling devices for rectangular electrical waveguide structures wherein radio frequency energy is transmitted.

In virtually every situation wherein a waveguide energy transmission system is employed, some form of flexible coupling is necessary. The need for flexibility arises from many considerations, such as ease of assembly, compensation for thermal expansion and contraction as well as to absorb vibration to thereby prevent premature breakage or dislocation of equipment.

Many types of flexible couplings have been available in the past, such as ball and socket joints, and bellows type joints, both of which are designed for relatively large angle flexibility and are of complex structure necessitated by the requirement of maintaining an impedance match with the waveguide despite large angles of flexure. So-called "flexible waveguide" has also been used extensively but it has rather short life expectancy, eventually breaking at a bending point where it is flexed most.

Where only a small amount of flexibility is needed as in the instances mentioned above, it is desirable to have a flexible device of simple structure which maintains nevertheless a good impedance match and has long life expectancy.

Accordingly it is an object of the present invention to provide a flexible coupling device for a waveguide electrical energy transmission line.

Another object of the present invention is to provide a waveguide coupling unit suitable for use where small angular flexibility is required.

Other and further objects and features of the present invention will become apparent upon a careful consideration of the following detailed description and the accompanying drawings wherein, Fig. 1 is a side elevation view of a waveguide flexible coupling constructed in accordance with the teachings of the present invention.

Fig. 2 is a cross-section view taken along the line 2—2 of Fig. 1.

Fig. 3 is a perspective view of a component of the waveguide flexible coupling.

With reference now to Figs. 1, 2, and 3 of the drawing, a typical apparatus is shown therein embodying the features of the present invention as applied specifically to a rectangular waveguide system wherein a joint is to be made by means of a coupling under conditions requiring small amounts of flexibility. In the showing of Fig. 1, the rectangular waveguide ends to be joined 10, 11 have their wide cross-sectional dimension in the plane of the paper with their narrow dimension perpendicular to the plane of the paper.

Affixed to the waveguide ends 10 and 11 is a pair of flanges 12 and 13. The flanges are of simple structure, such as conventional flanges as used to rigidly affix two waveguide ends together. Normally each flange may include an open ended box-like rectangular portion 16, 17 having internal dimensions slightly larger than the external dimensions of the waveguide so that it may be slipped over the waveguide end and affixed in position as by soldering, welding, or brazing or the like. The waveguide flanges include also a plate-like portion 14, 15 of outside dimensions considerably larger than the external dimensions of the box-like sections 16, 17 and having a rectangular aperture in the center thereof slightly larger than the external dimensions of the box-like member permitting insertion of the box-like member into the plate aperture and attachment thereto by some suitable process such as soldering, brazing or welding. The thickness of the flange plate members and box-like members is not critical, it being sufficient merely that they possess adequate mechanical strength for the conventional purpose of rigidly attaching waveguides together. As alternatives to the above arrangement, each plate member and its box-like member may be integrally cast in one piece prior to attachment to the waveguide or the plate-like members 14 and 15 alone may be directly attached to the waveguide without a box-like member.

The flanges 12 and 13 are connected together by means of four members of approximately semi-cylindrical shape which are formed from relatively thin flexible stock. These four semi-cylindrical connecting members possess lengths substantially equal to the internal cross-sectional dimensions of the waveguide. As shown in the cross-sectional view of Fig. 2, the semi-cylindrical members identified by the reference characters 18, 19, 20, 21 are reentrantly assembled presenting a concave assembly with the members 18 and 19 approximately equal in length to the "width" dimension of the waveguide while the members 20 and 21 are approximately equal in length to the "thickness" dimension of the waveguide. Attachment of the members 18, 19, 20 and 21 to the flanges is preferably made by means of suitable bolts or screws indicated by the numeral 22. To permit the use of thin materials for the members 18, 19, 20 and 21, without undue danger of breakage in the regions of the bolts as well as to provide good electrical contact throughout the length of the members 18, 19, 20 and 21, it is preferable that these members be attached to the flanges with backing plates 23 providing substantially uniform pressure throughout the entire length thereof. To further assist in the uniformity with which the members 18, 19, 20 and 21 are attached to the flanges, it is desirable that gaskets 24 be sandwiched between each backing plate 23 and the corresponding member 18, 19, 20 and 21. The members 18, 19, 20 and 21 are drilled appropriately to permit passage of the mounting bolts 22 and as shown in Fig. 3 these holes are enlarged to permit some flexibility or leeway in mounting. It has been found that this flexibility is desirable for several reasons, first to permit minor compensation for axial displacement of the waveguide ends 10 and 11 at the time of assembly and secondly, to permit adjustment of the members 18, 19, 20 and 21 inwardly or outwardly to secure the best impedance match.

With the structure as thus obtained, it is noted that the waveguide is not necessarily airtight, there being small openings at the corners usually. These openings, although providing discontinuities, are not large enough to cause any appreciable impedance mismatch or power loss over a wide frequency range.

In a specific device constructed in accordance with the teachings of the invention built for use with waveguides having dimensions of 3¼ by 6½ inches joined by a coupling embodying the invention, movement of the waveguide ends toward or away from each other by more than ⅛ of an inch was easily accommodated. Additionally, it was possible to obtain an angular movement of the joined waveguides by somewhat greater than 5 degrees in any direction without the voltage standing wave ratio exceeding 1.02.

From the foregoing it is seen that a waveguide coupling unit is provided which gives flexibility in mounting and use and which provides a good impedance match to electrical energy conducted therethrough.

Obviously many modifications and variations of the present invention are possible in the light of the above teachings. It is therefore to be understood that within the scope of the appended claims the invention may be practiced otherwise than as specifically described.

What is claimed is:

1. A flexible coupling for joining two sections of hollow rectangular cross-section waveguide having a predetermined characteristic impedance path, comprising, externally extending flanges adapted for mounting on the ends of the waveguide sections to be joined, two flexible conducting members of generally U-shaped cross section each having legs and being substantially equal in length perpendicular to said U-shaped cross section to the waveguide cross-section interior width dimension, two further flexible conducting members of generally U-shaped cross section each having legs and being substantially equal in length perpendicular to said U-shaped cross section to the wave guide cross-section interior height dimension and means securing one leg of all the generally U-shaped members to each of said flanges with the curved portion of the U-shaped members extending toward the center of said flanges, said curved portions defining a passage substantially identical with the inside dimensions of the waveguides, whereby to provide an impedance path substantially equal to that of the waveguide sections to be joined.

2. A flexible coupling for joining two sections of hollow waveguide having a polygonal cross section comprising externally extending flanges adapted to be mounted on the ends of said waveguide sections to be joined, a number of joint forming members equal to the number of wave guide side members, each joint forming member being of generally U-shaped cross section and of a length perpendicular to said U-shaped cross section substantially equal to the transverse interior dimensions of a corresponding waveguide side member, means securing one leg of each of the generally U-shaped joint forming members to each of said flanges with the curved portion of the member extending toward the center of said flanges, said curved portions defining a passage substantially identical with the interior cross-section of the waveguide sections, whereby to form an inner surface offering an impedance path substantially equal to that of the wave guide sections to be joined.

References Cited in the file of this patent

UNITED STATES PATENTS

| | | |
|---|---|---|
| 1,944,135 | Dennis | Jan. 16, 1934 |
| 2,282,354 | Gunn | May 12, 1942 |
| 2,374,498 | Quayle | Apr. 24, 1945 |
| 2,561,130 | McClellan | July 17, 1951 |
| 2,597,081 | Goodhoe | May 20, 1952 |
| 2,597,143 | Aron | May 20, 1952 |
| 2,643,139 | Hamilton | June 23, 1953 |